United States Patent [19]
Klein

[11] Patent Number: 5,779,449
[45] Date of Patent: Jul. 14, 1998

[54] SEPARABLE, MULTIPARTITE IMPELLER ASSEMBLY FOR CENTRIFUGAL PUMPS

[75] Inventor: Manfred P. Klein, Highland Park, Ill.

[73] Assignee: Ansimag Inc., Elk Grove Village, Ill.

[21] Appl. No.: 632,303

[22] Filed: Apr. 15, 1996

[51] Int. Cl.⁶ .................... F04D 29/20; F04B 17/00
[52] U.S. Cl. .............. 416/244 R; 417/360; 417/420; 29/453; 29/889.2
[58] Field of Search .................. 416/204 R, 244 R, 416/3; 417/360, 420; 29/453, 889.2; 403/327, 329, 383, DIG. 7; 285/319, 921; 464/179, 182, 183, 185

[56] References Cited

U.S. PATENT DOCUMENTS

| | | | |
|---|---|---|---|
| 2,906,208 | 9/1959 | White | 416/221 |
| 3,743,437 | 7/1973 | Warren . | |
| 3,784,235 | 1/1974 | Kessler et al. | 285/921 |
| 3,837,690 | 9/1974 | Fraser, Jr. et al. | 285/319 |
| 3,912,009 | 10/1975 | Davis, Jr. | 285/319 |
| 3,927,703 | 12/1975 | Beaubien | 285/921 |
| 4,001,541 | 1/1977 | Onal . | |
| 4,169,793 | 10/1979 | Lockshaw | 285/319 |
| 4,248,571 | 2/1981 | Sieghartner . | |
| 4,275,907 | 6/1981 | Hunt | 285/319 |
| 4,479,756 | 10/1984 | Sieghartner . | |
| 4,486,034 | 12/1984 | Sauer | 285/319 |
| 4,779,902 | 10/1988 | Lee | 285/921 |
| 4,793,771 | 12/1988 | Laing . | |
| 4,832,573 | 5/1989 | Dorski . | |
| 4,850,818 | 7/1989 | Kotera . | |
| 5,176,406 | 1/1993 | Straghan | 285/319 |
| 5,277,500 | 1/1994 | Keck . | |

*Primary Examiner*—Christopher Verdier
*Attorney, Agent, or Firm*—Darin E. Bartholomew

[57] ABSTRACT

The multipartite impeller assembly includes an impeller portion, a magnetic coupler, a snap-fit connector, and a radial bearing. The impeller portion and the magnetic coupler have complementary polygonal shapes which can be interlocked. The impeller portion and the magnetic coupler are secured together by a snap-fit connector, which is reinforced by a radial bearing adjacent to the snap-fit connector. The radial bearing prevents radial movement of the snap-fit connector or snap-fit joint, which could otherwise tend to release the snap-fit joint.

43 Claims, 13 Drawing Sheets

SEPARABLE, MULTIPARTITE IMPELLER ASSEMBLY FOR CENTRIFUGAL PUMPS

FIELD OF INVENTION

The present invention is generally directed toward an impeller for centrifugal pumps; and more particularly toward a multipartite impeller assembly for magnetic-drive centrifugal pumps.

BACKGROUND ART

In magnetic-drive pumps, a wet-end magnetic coupler is permanently or removably attached to the impeller. For example, the wet-end magnetic coupler may be permanently coupled to the impeller by molding the impeller and wet-end magnetic coupler together. The wet-end magnetic coupler is attached to the impeller at the impeller's rear, creating an indivisible impeller-magnetic coupler unit. If the impeller is damaged or if an impeller of a different size is required, the entire unit must be replaced.

Some pump manufacturers have removably coupled the wet-end magnetic coupler to the impeller's rear. However, removable connections between the impeller and wet-end magnetic coupler often lack stability. The background art has connected the impeller to the wet-end magnetic coupler by threaded connections, twist-on connections, and spline connections. The threaded connection and twist-on connection may loosen during occasional reverse rotation of the impeller causing the partial or complete disengagement of the magnetic coupler and the impeller. Spline connections loosen in response to axial forces placed upon the impeller; especially when wear rings are worn. Consequently, damage to the pump and containment shell of a magnetic-drive pump can result from failure of the background art connections. Therefore, the need exists for an impeller assembly which stays together during normal pump operation, but allows for severability of the impeller and wet-end magnetic coupler during maintenance, manufacturing, and pump assembly.

SUMMARY OF THE PRESENT INVENTION

The multipartite impeller assembly comprises an impeller portion, a magnetic coupler, a snap-fit connector, and a radial bearing. The impeller portion and the magnetic coupler have complementary polygonal shapes which can be interlocked. The impeller portion and the magnetic coupler are secured together by a snap-fit connector, which is reinforced by a radial bearing or a cylindrical member adjacent to the snap-fit connector. The radial bearing prevents radial movement of the snap-fit connector or snap-fit joint, which tends to release or disengage the snap-fit joint.

In a preferred embodiment, the impeller portion preferably has a polygonal extension and a tube protruding from a rear shroud of the impeller. The polygonal extension interlocks with a polygonal recess in the magnetic coupler, while the tube interlocks with a hollow core in the magnetic coupler. The tube optimally terminates in a substantially annular snap-fit protrusion or a discontinuous annular snap-fit protrusion. The snap-fit protrusion interlocks with a snap-fit cavity. The snap-fit cavity is located in the hollow core of the magnetic coupler. The radial bearing is positioned within a tube interior of the tube. An outer surface of the radial bearing is secured to the tube interior while an inner surface of the radial bearing is available to cooperate with a pump shaft.

To assemble the impeller assembly, the hollow core of the magnetic coupler is first slid over the tube. The snap-fit protrusion contracts while being slid through a hollow region of the hollow core. Once the snap-fit protrusion encounters the snap-fit cavity, the snap-fit joint resiliently expands. A snap-fit connector is formed by the combination of the snap-fit protrusion and the snap-fit cavity. The snap-fit cavity includes a step or a snap-fit ledge between the snap-fit cavity and the hollow region. The step engages the snap-fit protrusion to prevent axial movement of the snap-fit protrusion. Finally, a radial bearing or a cylindrical member is placed within the tube to lock the snap-fit connector in a connected state. The presence of the radial bearing reinforces the snap-fit connector and prevents separation of the multipartite impeller assembly during normal operation of the pump.

The impeller may be used in centrifugal pumps such as magnetic-drive pumps, canned pumps, synchronous magnetic-drive pumps, and nonsynchronous magnetic-drive pumps. The magnetic coupler includes, for example, a wet-end magnetic coupler. The wet-end magnetic coupler has a plurality of magnets or a torque ring for magnetic coupling between the wet-end magnetic coupler and a dry-end magnetic coupler. A motor drives the dry-end magnetic coupler which in turn imparts rotational motion to the magnetic coupler and impeller portion of the present invention.

BRIEF DESCRIPTION OF THE DRAWINGS

—FIG. 2C shows the union of the axial bearing and the impeller portion.

FIG. 3B shows the separation of the magnetic coupler from the impeller portion.

DETAILED DESCRIPTION OF THE PREFERRED EMBODIMENTS

Multipartite Impeller Assembly

Figure 1A:
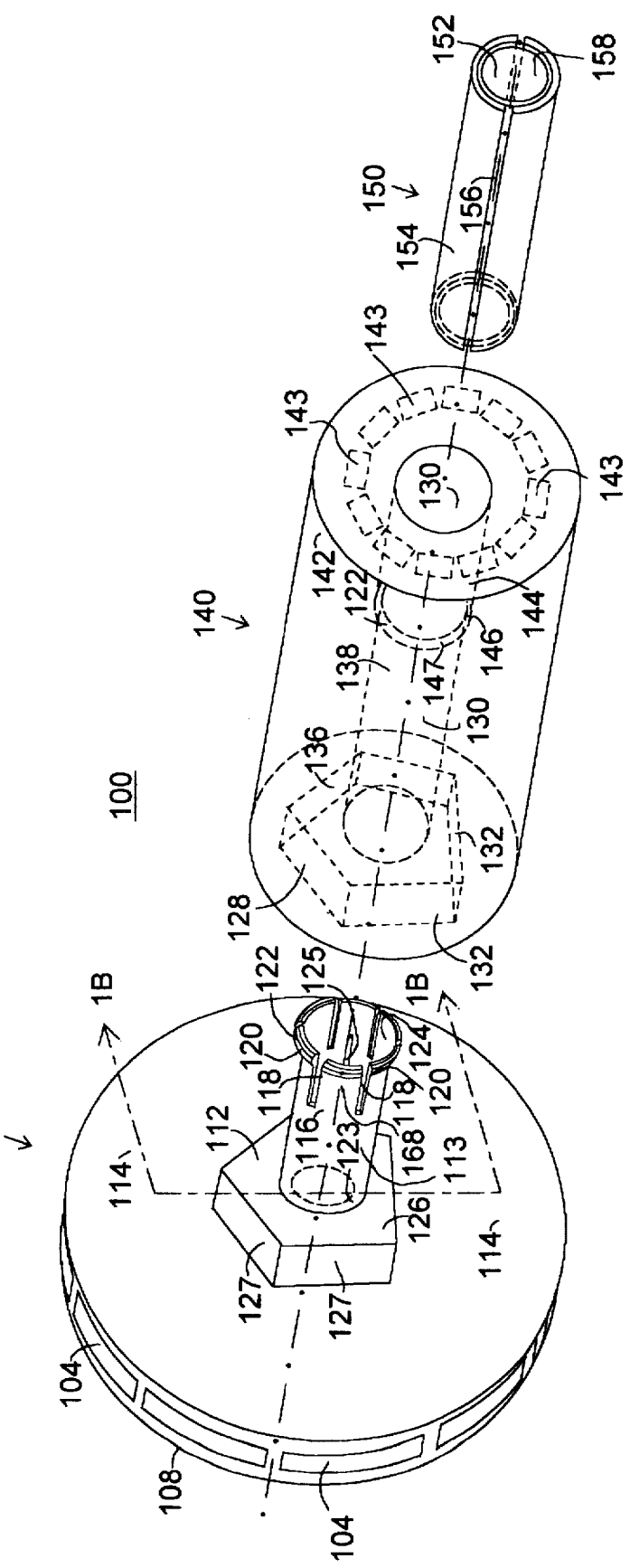
FIG. 1A is an exploded, perspective view of a first embodiment of the multipartite impeller assembly for a centrifugal pump.
Figure 1B:
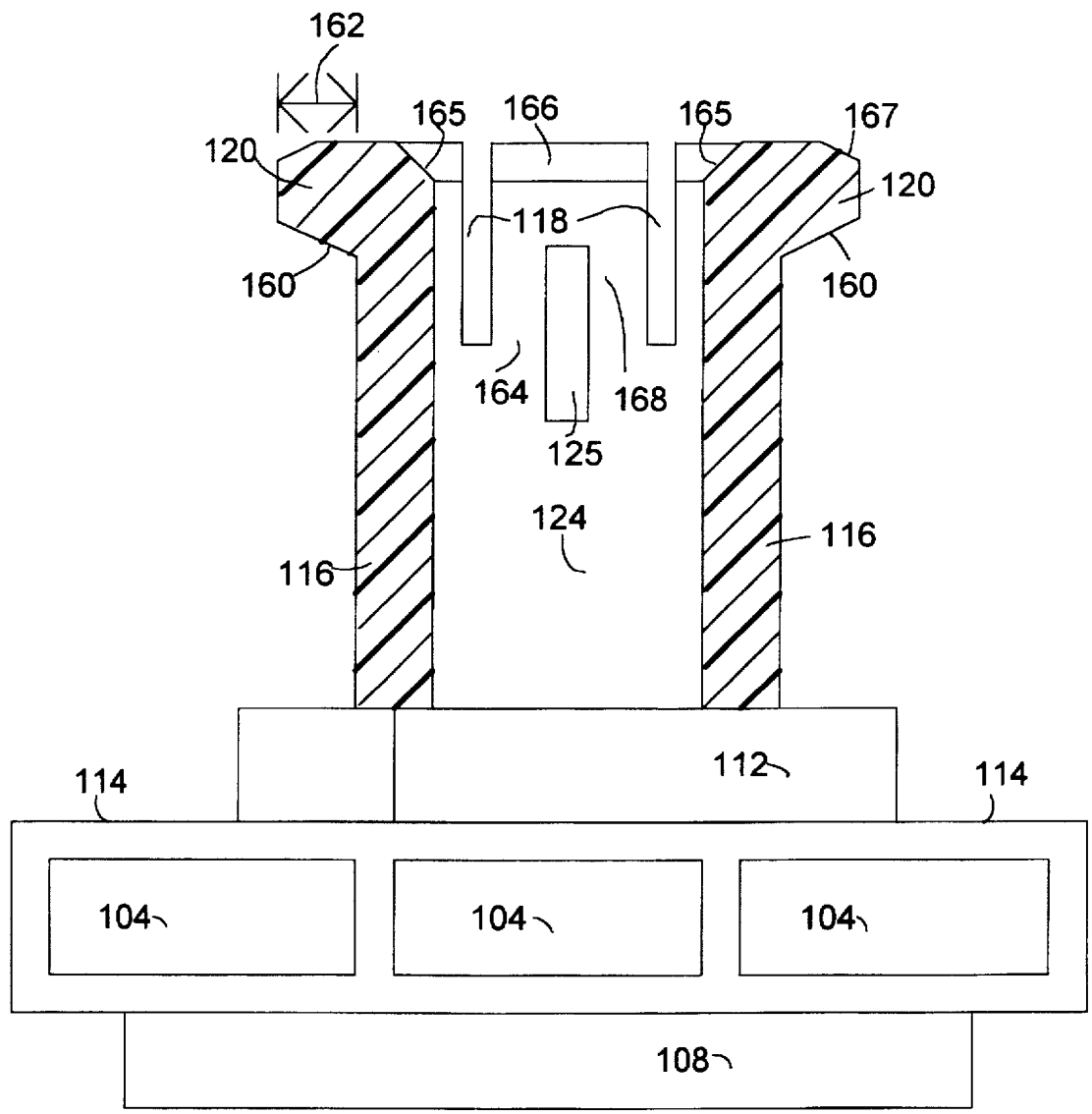
FIG. 1B is a cross-sectional view of the impeller portion as viewed along reference line 1B—1B of FIG. 1A.
Figure 1C:
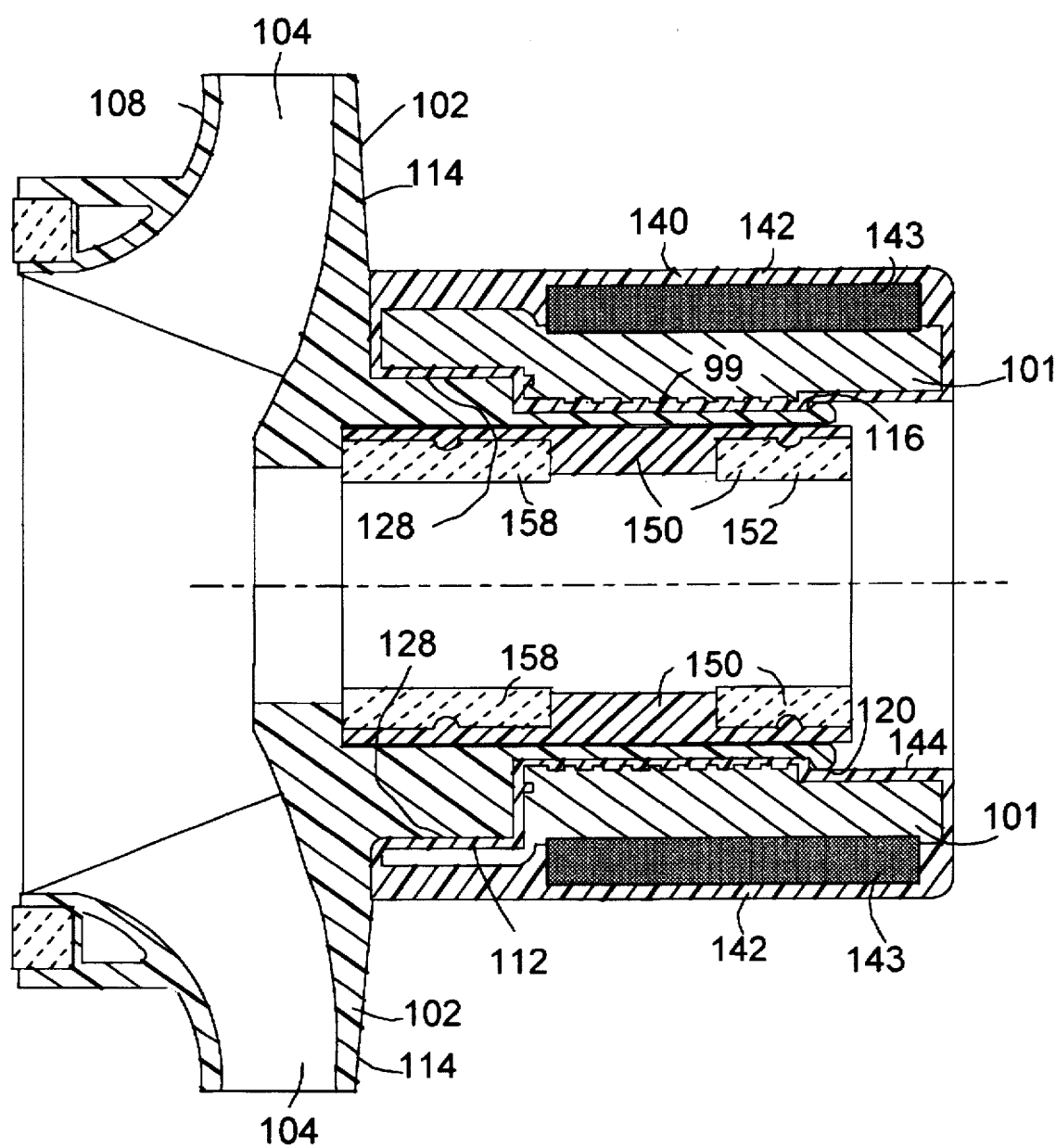
FIG. 1C is a cross-sectional view of the first embodiment of the multipartite impeller assembly of FIG. 1A, wherein the impeller assembly is assembled.

FIG. 1A through FIG. 1C, inclusive, show a first embodiment of the multipartite impeller assembly. The impeller assembly 100 includes an impeller portion 102, a magnetic coupler 140, a snap-fit connector 122, and locking means (i.e. radial bearing 150) for locking the snap-fit connector in a connected state. The impeller portion 102 interlocks and mates with a hollow core 130 in the magnetic coupler 140. A snap-fit connector 122 fastens the impeller portion 102 to the magnetic coupler 140. The locking means comprises a substantially cylindrical member or a radial bearing 150. The radial bearing 150 resides within a hollow region 138 of the magnetic coupler 140 radially adjacent to the snap-fit connector 122. The locking means or radial bearing 150 prevents disengagement of the snap-fit connector 122. Once assembled, the impeller portion 102, and the magnetic coupler 140, and the radial bearing 150 form a durable, cohesive unit. Yet, the impeller assembly 100 may be readily disassembled for servicing and maintenance.

The impeller portion 102 preferably has a closed-impeller configuration with a front shroud 108 and a rear shroud 114. The front shroud 108 is adjacent to the intake for the blades or vanes. The outlets 104 of the impeller portion 102 are located about the radial periphery of the impeller portion 102.

The impeller portion 102 has a tube 116 extending axially from the center of the rear shroud 114. The tube 116 is oriented coaxially with respect to the radial bearing 150 or another substantially cylindrical locking means. The cylindrical shape of the tube 116 permits the thickness of the tube 116 to be readily controlled during manufacturing. The cylindrical shape of the tube 116 also allows the orientation of the tube 116, with respect to the center of the impeller portion 102, to be controlled during manufacturing. The tube 116 preferably has a substantially cylindrical tube interior 124 with ridges 125 or retaining means (i.e. a key or spline arrangement) for retaining the locking means or radial bearing 150. The tube 116 terminates in at least one snap-fit protrusion 120.

The rear shroud 114 has torque receiving means for receiving torque from the magnetic coupler 140. The torque receiving means preferably comprises a polygonal extension 112 that protrudes from the rear shroud 114. The torque receiving means receives torque from the torque transmitting means, which is associated with the magnetic coupler 140. The torque transmitting means corresponds in size and shape to the torque receiving means such that the torque transmitting means interlocks with and engages the torque receiving means.

For example, where the torque receiving means comprises a polygonal extension 112 from the impeller portion 102, the torque transmitting means comprises a corresponding polygonal recess 128 in the magnetic coupler 140. The polygonal extension 112 interlocks with and engages its corresponding polygonal recess 128. The polygonal recess 128 is combined with the polygonal extension 112 so that the recess bottom 136 is located adjacent to the extension end 126. Rotation of the polygonal recess 128 imparts rotation in the polygonal extension 112 and to the rest of the impeller portion 102. For additional engineering design information on polygonal shaft connections, German DIN standards 32711 and 32712 may be referenced.

The polygonal extension 112 preferably has a number of extension sides 127 which corresponds to the number of impeller blades such that internal forces in the impeller portion 102 are evenly distributed. For example, if the impeller portion 102 has five blades, then the polygonal extension 112 is optimally pentagonal. Likewise, if the impeller has six blades, then the polygonal extension should have six sides.

Proportional correspondence between the number of sides of the polygonal extension 112 and the number of blades produces cyclo-symmetric forces within the rear impeller shroud 114 and through the polygonal extension 112. Cyclo-symmetric forces means, for example, that the stress at each corner of the polygonal extension 112 is approximately the same. The rear shroud 114 tends to warp less from applied stresses when forces are evenly distributed throughout the rear shroud 114. Moreover, correspondence between the number of sides of polygonal extension 112 and the number of blades permits the polygonal extension 112 to have a uniform cross-sectional thickness and construction based on the estimated design load.

The impeller portion 102 is made from a corrosion-resistant plastic, a fluoroplastic, a polymer, a fiber-reinforced plastic, a plastic composite, a polymer composite, a fiber-reinforced polymer, or the like. The impeller portion 102 is preferably constructed from carbon fiber-filled ETFE. Alternatively, the impeller may be made from PTFE, PCTFE, PVDF, PVF, FEP, ETFE, PFE, ECTFE, EFE, or the like. An assortment of suitable corrosion resistant materials are outlined in the *Handbook of Plastics, Elastomers, and Composites* by Charles A. Harper, published by McGraw-Hill, Inc. in New York, N.Y. (Second Edition 1992). The chart in Appendix C on pages C1 to C50 of the *Handbook of Plastics, Elastomers, and Composites* is hereby incorporated by reference into this specification.

The magnetic coupler 140 has a generally cylindrical exterior surface with a hollow core 130. The hollow core 130 includes a polygonal recess 128, a hollow region 138, and snap-fit cavity 144 located along the magnetic coupler's axis. One end of the magnetic coupler 140 contains the polygonal recess 128 with recess sides 132. The opposite end of the magnetic extension 112 with rounded corners and radiused sides reduces the chance of undesirable weld lines in the plastic molding or encapsulation process.

The hollow region 138 is located between the polygonal recess 128 and the snap-fit cavity 144. The snap-fit ledge 146 is a shoulder that separates the snap-fit cavity 144 from the hollow region 138. The hollow region 138 is substantially cylindrical. The hollow region 138 has a hollow radius which corresponds to the exterior radius of the tube 116 such that the tube 116 may extend axially through the hollow region 138. The snap-fit cavity 144 has a cavity size, or cavity radius, which is larger than the hollow radius of the hollow region 138. The snap-fit cavity 144 is optimally substantially annular or cylindrical. The snap-fit cavity 144 preferably extends to one end of the magnetic coupler 140 to simplify manufacturing.

The magnetic coupler 140 has a first magnetic coupling region 142 comprising electromagnets, rare-earth magnets, magnets, ferrous metals, a torque ring, magnetic members, or the like. The first magnetic coupling region 142 is encapsulated by a corrosion-resistant layer. The corrosion-resistant layer has a sufficient thickness to isolate the magnetic members 143 or ferrous metals from caustic and/or hazardous fluids. The magnetic members 143 are preferably arranged in a circular fashion or radially about the periphery of the magnetic coupler 140. The first magnetic coupling region 142 cooperatively interacts with a second magnetic coupling region located in the dry-end magnetic coupler (not shown).

As best shown by FIG. 1C, the magnetic coupler may contain a sleeve reinforcement 101 with a corrugated or ridged inner surface 99. The sleeve reinforcement 101 is substantially cylindrical and preferably is constructed from a metal, such as a nickel alloy or stainless steel. The ridged inner surface 99 improves adhesion of the corrosion-resistant layer (i.e. encapsulating plastic) around the magnetic members 143 and the sleeve reinforcement 101 while permitting the thickness of the corrosion-resistant layer to be controlled.

The snap-fit connector 122 joins the magnetic coupler 140 to the impeller portion 102. The snap-fit connector 122 comprises a cantilever snap-fit joint, an annular snap-fit joint, a discontinuous annular snap-fit joint, or the like. The snap-fit connector 122 includes at least one snap-fit protrusion 120 and the snap-fit cavity 144. The snap-fit protrusion 120, the hollow region 138, or both the snap-fit protrusion 120 and the hollow region 138 temporarily deform during the assembly process. The dimensions, geometry, and material of the snap-fit protrusion 120 are selected to deform without significant strain damage during the assembly process. Once assembled, at least one snap-fit protrusion 120 engages the snap-fit cavity 144 in a virtually stress-free manner if external forces on the snap-fit connector 122 are ignored.

A radial group of snap-fit protrusions 120 is shown in FIG. 1A. Each snap-fit protrusion 120 is an arched or semi-annular ridge that extends radially from the tube 116. As best illustrated by the cross-sectional view in FIG. 1B, the snap-fit connector 120 preferably has a tapered edge 160 which rests against or near a snap-fit ledge 146 when assembled. The tapered edge 160 permits the snap-fit protrusion 120 to be disengaged and removed from the snap-fit cavity 144 when desired. The snap-fit protrusion 120 has a deflection dimension 162 which is approximately equal to the radial distance between the tube exterior 113 and utmost radial point of the snap-fit protrusion 120.

The snap-fit protrusion 120 optimally has a beveled interior corner 165 and a beveled exterior corner 167. The beveled interior corner 165 is sloped to allow the radial bearing 150 to be easily inserted into the tube interior 124. The beveled exterior corner 167 is sloped to allow the tube 116 to be easily inserted into the hollow region 138. In alternate embodiments, the snap-fit protrusion 120 may be shaped like a hook, stud, a bead, or the like.

The tube 116 optimally has axial slots 118 that divide tube 116 into a series of semi-annular arms 168 with arched cross sections. The semi-annular arms 168 have a first end 164 located near the deepest portion of the axial slot 118 and a second end 166 located near or coextensive with the snap-fit protrusion 120. Such a snap-fit connector as shown in FIG. 1A is sometimes referred to as a discontinuous annular snap-fit joint.

Discontinuous annular snap-fit joints have characteristics similar to cantilever arm snap-fit joints for dimensioning and design purposes. Where the snap-fit connector 122 is a discontinuous annular snap-fit joint, the permissible deflection for each semi-annular arm is given by the formulae $D=G\epsilon l^2/r_0$ where D is the permissible deflection, G is a geometric factor, $\epsilon$ is the permissible strain at an outer fiber near the first end 164 of the arm, 1 is the length of the semi-annular arm 168 measured from the first end 164 to the second end 166, and $r_0$ is the exterior or outer radius of the tube 116. The length of the semi-annular arm 168 is approximately equal to the axial length of each axial slot 118. The permissible defection D or deflection dimension 162 is approximately equal to the minimum radial dimension or snap-fit ledge dimension 147 of the snap-fit cavity 144. The geometric factor G is based upon the angular length of the arc of the semi-annular arm 168 and the ratio of the exterior tube radius to the interior tube radius of the tube 116. The permissible strain at the outer fiber near the first end 164 of the arm depends upon the material composition. For example, whether or not the material is reinforced with a filler such as fiber glass or carbon fiber affects the permissible strain.

The snap-fit connector 122 optimally allows for separation of the impeller portion 102 from the magnetic coupler 140. To further facilitate ease of disassembly, radial bores may be placed in the magnetic coupler 140 to permit the application of a radially inward force to release the snap-fit connector 122. On the other hand, if an inseparable or permanent snap-fit connection were desired then the tapered edge 160 would be replaced by an orthogonal edge. The orthogonal edge would be substantially orthogonal to the outer surface of the tube 116, preventing easy disassembly of the impeller portion 102 from the magnetic coupler 140.

The retention force or separating force of the snap-fit connector 122 equals the permissible deflection force of the arm plus the friction force. The separating force is designed to accommodate two countervailing objectives. The first objective is to prevent the impeller portion 102 from separating from the magnetic coupler 140 during normal pump operation. The second objective is to allow ready disassembly of the pump for maintenance or part replacement. The countervailing objectives are achieved by the presence of the locking means for locking the snap-fit connector 122 in a connected state.

The locking means comprises a substantially cylindrical member, a radial bearing 150, a sleeve, a bushing, or the like. The locking means is inserted into the tube interior 124 radially adjacent to the snap-fit connector 122. The locking means prevents disassembly of the snap-fit connector 122 by preventing radial flexing of at least one snap-fit protrusion 120. To further prevent undesired separation of the impeller portion 102 and the magnetic coupler 140, the separation force is selected based upon the strain-dependent modulus or secant modulus of elasticity of the material, the permissible strain, the length of the semi-annular arm 168, and the section modulus according to practices known to one of ordinary skill in the art.

For annular snap-joints or discontinuous annular snap joints, the separating force may depend upon the location of the snap-fit ledge 146 that marks the beginning of the snap-fit cavity 144 in the tube interior 124. If the snap-fit cavity 144 is located near an end of the tube 116 then the separating force is typically less than if the snap-fit cavity is located remotely from the end of the tube 116. If the snap-fit cavity 144 were located remotely with respect to the end of the tube 116, the snap-fit protrusion 120 would still be formed by an annylar elevation extending radially from the tube exterior 113. In particular, if the snap-fit ledge 146 is roughly located an axial distance that exceeds a minimum axial distance from the tube end, then the separating force is increased compared to where the snap-fit ledge 146 is located closer than the minimum axial distance to the tube end. The minimum axial distance is calculated by: first, determining the product of the tube diameter and the tube wall thickness of the tube 116; second, taking the square root of the product; third, multiplying the resultant square root by two.

The radial bearing 150 is optimally capable of functioning both as a radial bearing 150 and as a locking means for the snap-fit connector 122. The radial bearing 150 has an inner surface 152 and an outer surface 154. The inner surface 152 may be defined by a cylindrical ceramic member 158 while the outer surface 154 is made from a plastic, a plastic composite, a polymer, a polymer composite, a fiber-reinforced plastic, or the like. The inner surface 152 cooperates with a shaft that is coaxially surrounded by the inner surface 152. The outer surface 154 has a retaining channel 156 which corresponds to a ridge 125 in the tube interior 124 of the tube 116. The ridge 125 and the retaining channel 156 are engaged so that the radial bearing 150 rotates with the impeller portion 102.

Assembling of the Multipartite Impeller Assembly

Figure 2A:
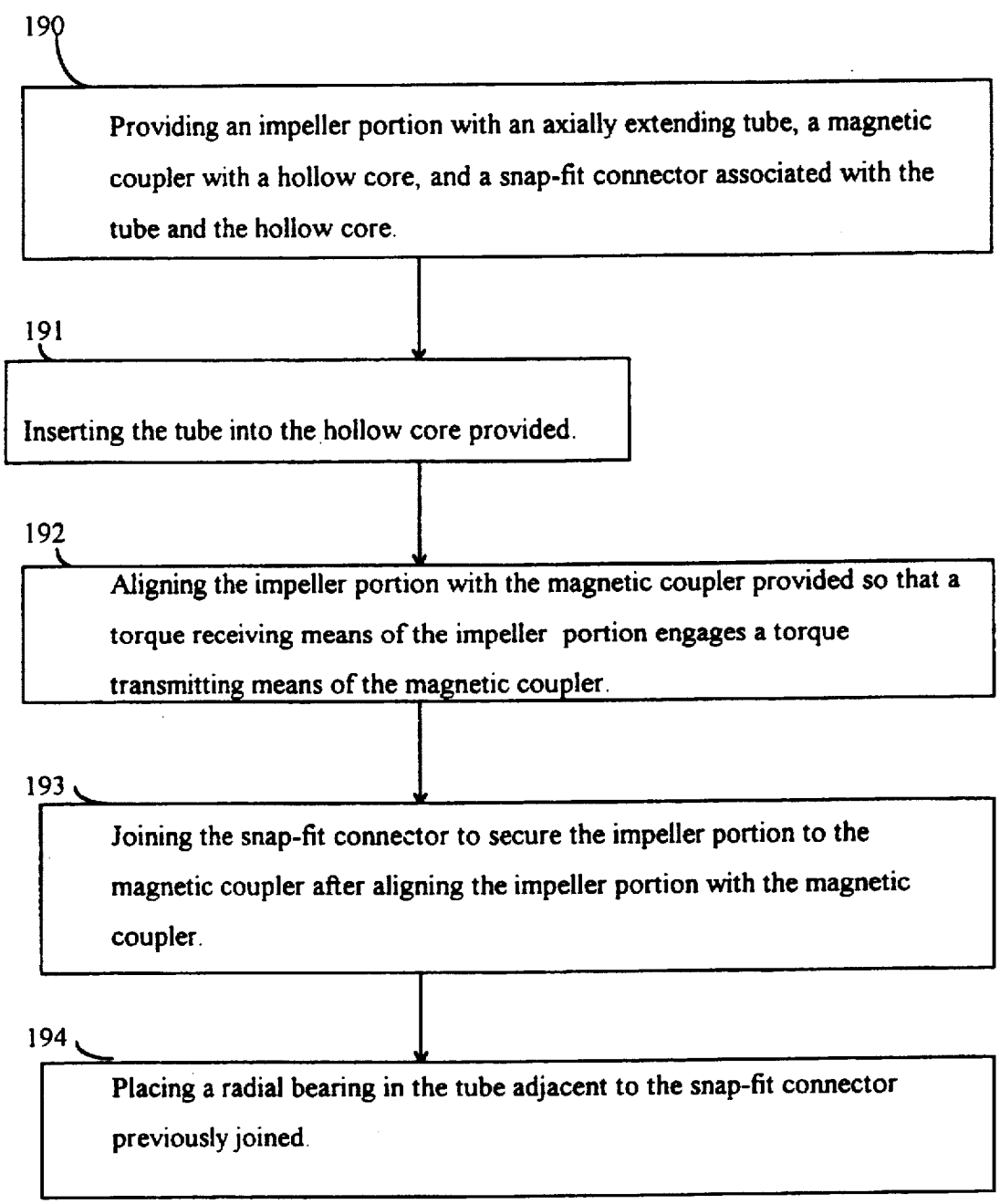
FIG. 2A is a flow chart of the assembly process for the multipartite impeller assembly.
Figure 2B:
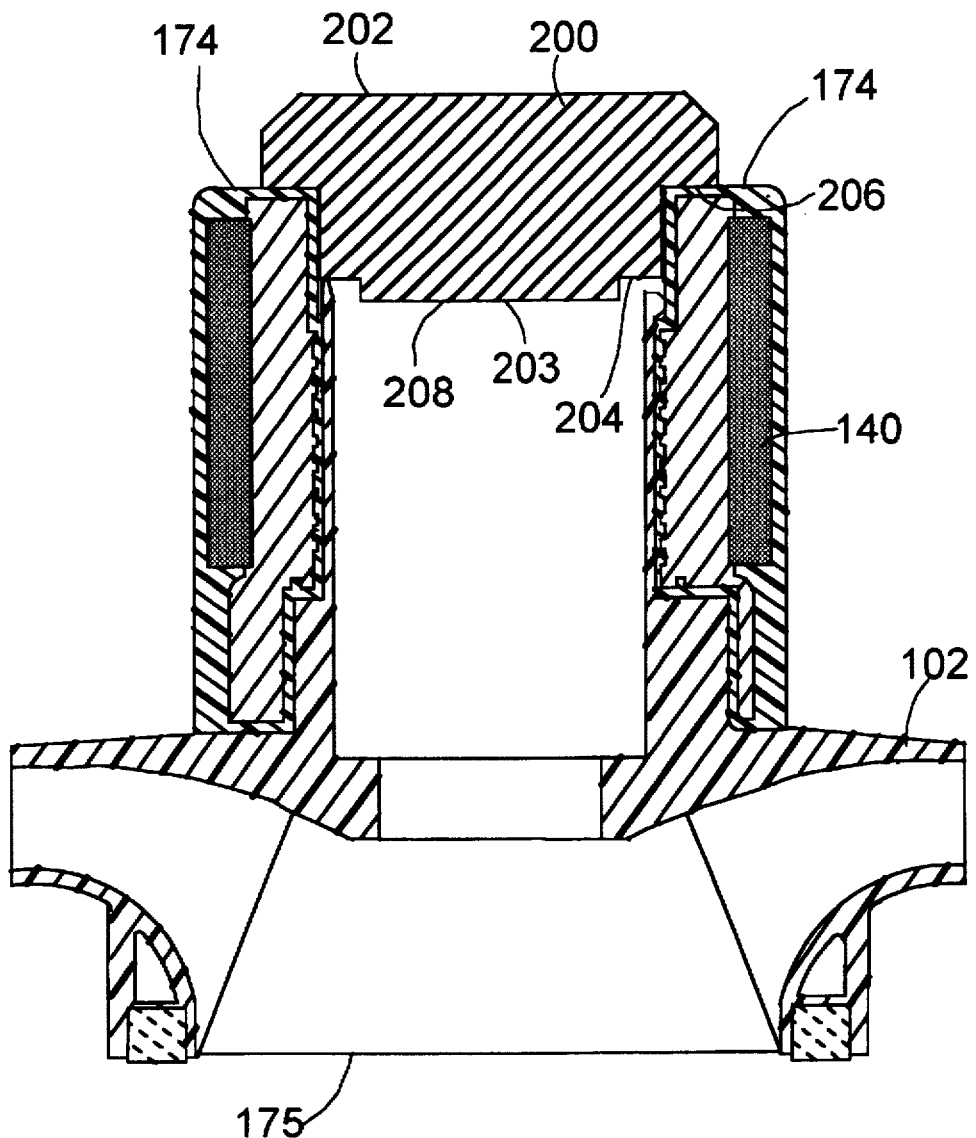
FIG. 2B shows the portion of the assembly process of the multipartite impeller assembly in which the impeller portion and the magnetic coupler are joined.
Figure 2C:
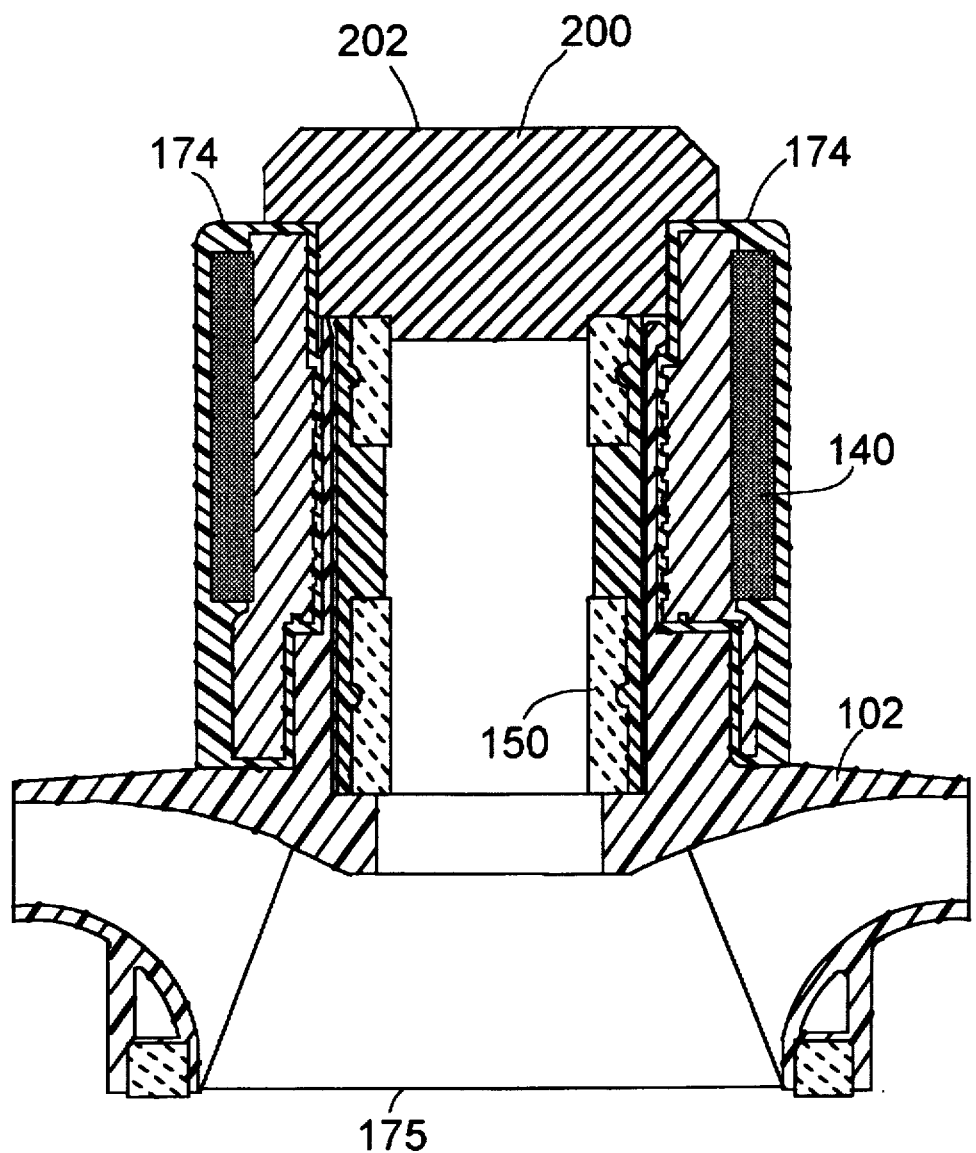
FIG. 2C is a continuation of the assembly process illustrated in FIG. 2B

FIG. 2A through FIG. 2C show assembling of the multipartite impeller assembly 100 previously illustrated in FIG. 1A. The method of assembling an impeller assembly comprises the following steps: First, in block 190, an impeller portion 102 with an axially extending tube 116, a magnetic coupler 140 with a hollow core 130, and a snap-fit connector 122 associated with the tube 116 and the hollow core 130 are provided. Second, in block 191, the tube 116 is inserted into the hollow core 130 provided. Third, in block 192, the impeller portion 102 is aligned with the magnetic coupler 140 provided so that a torque receiving means of the impeller portion engages a torque transmitting means of the magnetic coupler 140. For example, the polygonal extension 112 and the polygonal recess 128 are rotated for alignment, as necessary, such that the polygonal extension 112 can be inserted into the polygonal recess 128. Fourth, in block 193, the snap-fit connector 122 is joined to secure the impeller portion 102 to the magnetic coupler 140 after aligning the impeller portion 102 with the magnetic coupler 140. Finally, in block 194, a radial bearing 150 or cylindrical member is placed in the tube 116 adjacent to the snap-fit connector 122 previously joined.

The assembly process advantageously allows a user to vary impeller characteristics by using a single, common magnetic coupler in combination with a variety of impeller portions. The variety of impeller portions has different hydraulic or hydrodynamic characteristics. In other words, one particular impeller portion is selected from the variety of impeller portions based on its hydraulic characteristics. For instance, the particular impeller portion is selected from the variety based upon a distinct design flow rate and a distinct design pressure output. Nevertheless, any one of the variety of the impeller portions may be combined with the common magnetic coupler. The choice of the impeller portion depends upon the actual application of the impeller assembly.

On the other hand, the magnetic characteristics of the impeller assembly could be varied by selecting the magnetic coupler from a variety of magnetic couplers having distinct magnetic characteristics. Any one of the magnetic couplers would be capable of combining with the impeller portion.

The union of the impeller portion 102 and the magnetic coupler 140 of FIG. 2B precedes the union of the impeller portion 102 and the radial bearing 150 of FIG. 2C. FIG. 2B illustrates the use of an assembly tool 200 to complete the union of the impeller portion 102 and the magnetic coupler 140. The assembly tool 200 has a series of concentric circular steps, including a first annular step 204 and a second annular step 206. An aligning protrusion 208 is associated with the first annular step 204. The cylindrical aligning protrusion 208 extends from a bottom 203 of the assembly too 200.

The second annular step 206 is placed on the impeller rear 174. Pressure is provided to the top 202 of the assembly tool 200 so that the semi-annular arms 168 of the snap-fit connector 122 bend to fit within the hollow region 138. The semi-annular arms 168 of snap-fit connector 122 resiliently, radially expand once the arms 168 encounter the snap-fit cavity 144. The snap-fit ledge 146 that separates the hollow region 138 from the snap-fit cavity 144 latches or interlocks with the snap-fit protrusion 120 preventing the magnetic coupler 140 from moving relative to the impeller portion 102.

After the impeller portion 102 and the magnetic coupler 140 are combined, the radial bearing 150 is combined with the impeller portion 102 in accordance with FIG. 2C. First, the radial bearing 150 is placed into the tube interior 124 so that the retaining channel 156 is aligned with the ridge 125. Second, the aligning protrusion 208 of the assembly tool 200 is placed in contact with the radial bearing 150. Third, downward pressure is applied to the top 202 of the assembly tool 200 until the second annular step 206 contacts the impeller rear 174. The second annular step 206 prevents potential damage to the impeller portion 102 by preventing the bearing 150 from extending too far forward into the tube interior 124. The end of the radial bearing 150 preferably contacts or approaches contact with the impeller ledge 123 (FIG. 1A) while the second annular step 206 simultaneously contacts the impeller rear 174.

Once the radial bearing 150 is completely inserted into the tube interior 124 and the retaining channel 156 mates with the ridge 125, inward radial movement of the snap-fit protrusion 120 is prevented. Therefore, the snap-fit connector 122 is effectively locked in place by the potential or actual compressive forces from the adjacent outer surface 154 of the radial bearing 150.

Disassembly of the Multipartite Impeller Assembly

Figure 3A:
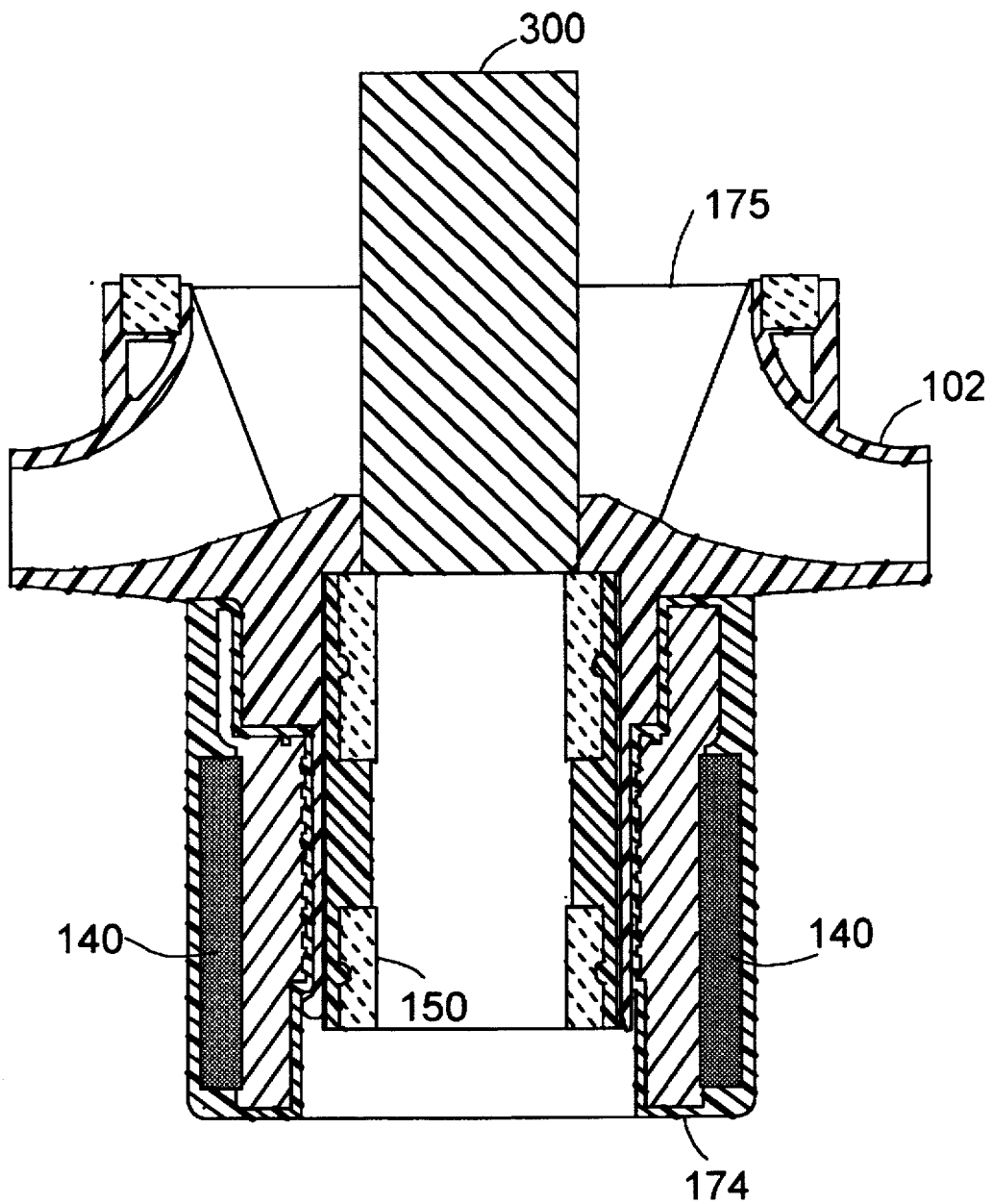
FIG. 3A shows the disassembly process of the multipartite impeller assembly in which the axial bearing is being separated from the impeller portion.
Figure 3B:
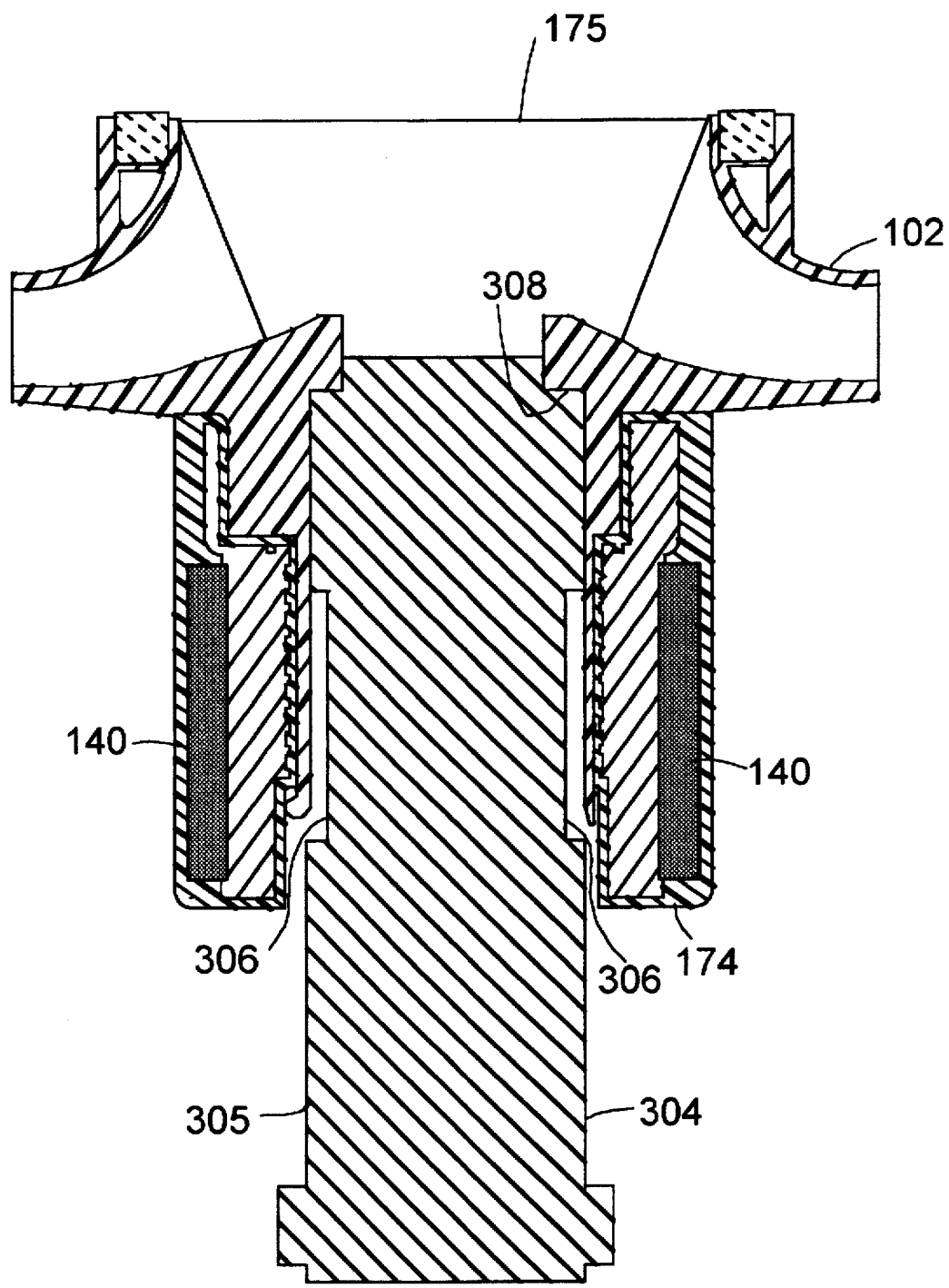
FIG. 3B shows a continuation of the disassembly process illustrated in FIG. 3A.

FIG. 3A and FIG. 3B show disassembling of the multipartite impeller assembly 100 previously illustrated in FIG. 1A. The separation of the impeller portion 102 and the radial bearing 150 of FIG. 3A precedes the separation of the impeller portion 102 and the magnetic coupler 140 of FIG. 3B.

To disassemble the impeller, first, the impeller portion 102 and the radial bearing 150 are separated. A bearing removal tool 300 is used to remove the radial bearing 150 from the impeller portion 102. The bearing removal tool 300 is substantially cylindrical with a radius selected to fit within a hollow hub of the impeller portion 102. The end of the bearing removal tool 300 is inserted into the hollow hub from the impeller front 175. The end of the bearing removal tool 300 should contact the radial bearing 150. Downward pressure is applied to the bearing removal tool 300 and the radial bearing 150 is driven out of the impeller rear 174.

After the radial bearing 150 is removed, then the magnetic coupler 140 is separated from the impeller portion 102 in accordance with FIG. 3B. The magnetic coupler 140 cannot be removed from the impeller portion 102 until the snap-fit connector 122 is released. The coupler removal tool 304 may be used to release the snap-fit connector 122. The coupler removal tool 304 has a first exterior surface 305 and a second exterior surface 306. The second exterior surface 306 is radially recessed relative to the first exterior surface 305 in the vicinity of the snap-fit connector 122 so that the snap-fit protrusion 120 and the semi-annular arm 168 can move radially inward to release the snap-fit connector 122. A puller may be attached to the coupler removal tool 304 to facilitate disassembly as is known to one of ordinary skill in the art.

The coupler removal tool 304 is inserted from the impeller rear 174 into the tube interior 124. The end of the coupler removal tool 304 substantially contacts the impeller ledge 123 (FIG. 1A). The end of the coupler removal tool 304 has a concentric cylindrical protrusion 308 of reduced radius to achieve contact with the impeller ledge 123. Once sufficient force is applied to the impeller ledge 123 relative to the magnetic coupler 140 via the coupler removal tool 304, the impeller portion 102 is released from the magnetic coupler 140.

Variations of Multipartite Impeller Assembly

Figure 4:
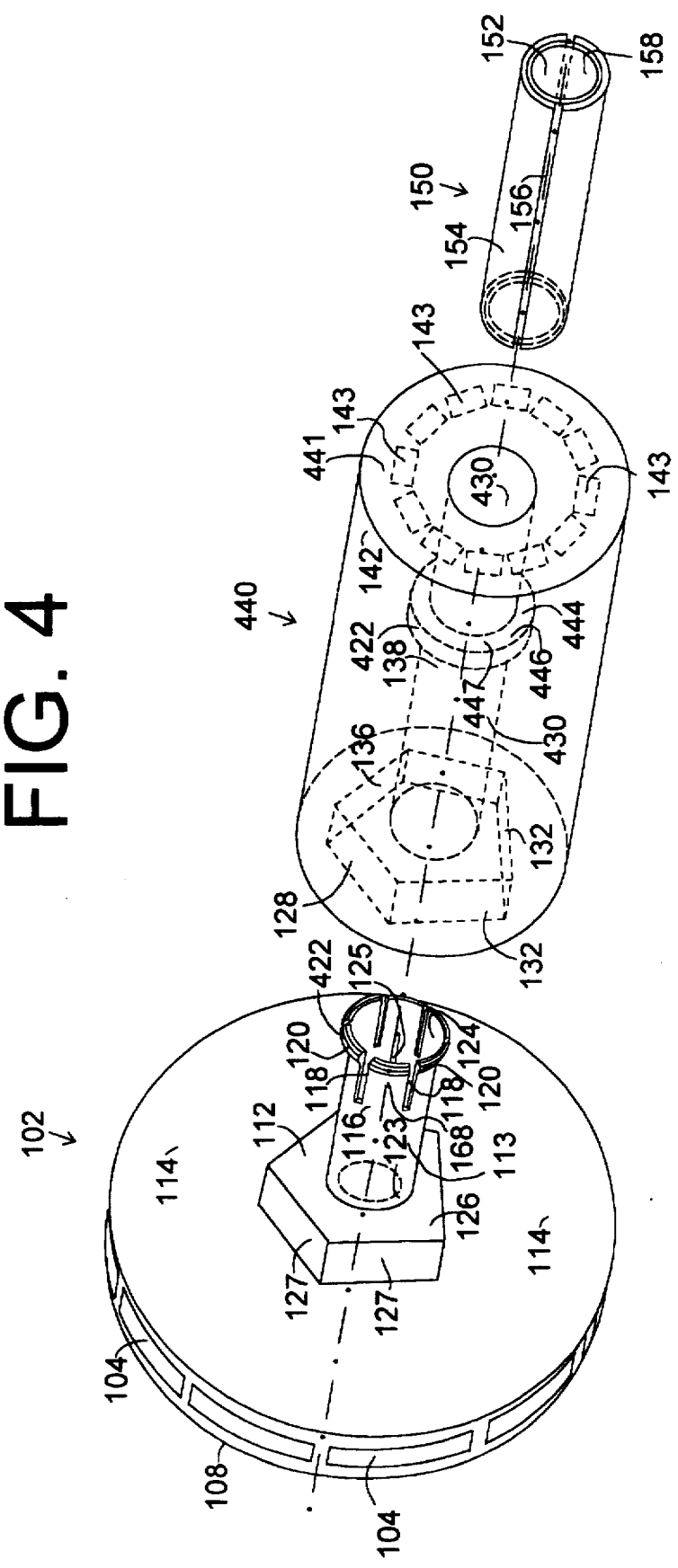
FIG. 4 is an exploded, perspective view of a second embodiment of the multipartite impeller assembly which features an annular snap-fit cavity.

FIG. 4 shows a second embodiment of the impeller assembly. The second embodiment of the impeller assembly is similar to the first embodiment of the impeller assembly of FIG. 1A except for the magnetic coupler and the snap-fit connector.

The snap-fit connector 422 comprises the combination of at least one snap-fit protrusion 120 and a snap-fit cavity 444. The magnetic coupler 440 has a snap-fit cavity 444 with a substantially annular shape. The snap-fit cavity 444 is located adjacent to the hollow region 138 of the hollow core 430. The snap-fit cavity 444 does not extend to a coupler end 441 of the magnetic coupler 440. The snap-fit cavity 444 has a snap-fit ledge 446 with a snap-fit dimension 447 or radial depth. The respective snap-fit dimension 447 is approximately equal to the corresponding deflection dimension that the snap-fit protrusion 120 radially extends from a tube exterior 113 of the tube 116.

Figure 5:
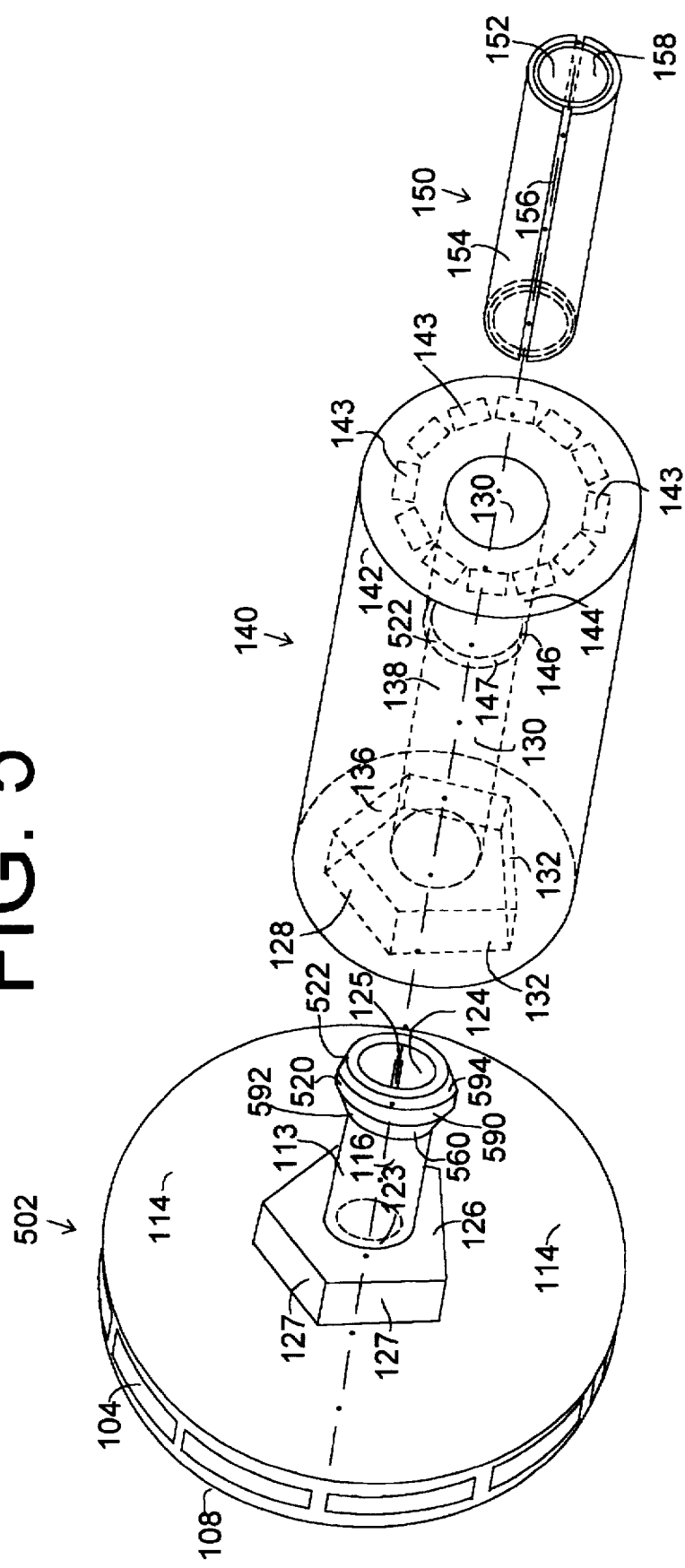
FIG. 5 is an exploded, perspective view of a third embodiment of the multipartite impeller assembly which features an annular snap-fit protrusion extending from the tube.

FIG. 5 shows a third embodiment of the impeller assembly. The third embodiment of the impeller assembly is identical to the first embodiment of the impeller assembly in FIG. 1A except for the impeller portion and the snap-fit connector.

The snap-fit connector 522 comprises the combination of a snap-fit protrusion 520 and the snap fit cavity 144. The impeller portion 502 has a tube 116 that terminates in a snap-fit protrusion 520. The snap-fit protrusion 520 is substantially annular and continuous. The snap-fit protrusion 520 preferably has a tapered edge 560 facing the rear shroud 114 so that the snap-fit connector 522 may be readily disassembled. The snap-fit cavity 144 in the hollow core 130 has a snap-fit ledge 146 and a snap-fit dimension 147. The snap-fit dimension 147 is approximately equal to or greater than the corresponding maximum radial dimension that the snap-fit protrusion 520 extends from a tube exterior 113 of the tube 116.

The snap-fit protrusion 520 optimally has a substantially flat summit 590, a front slope 592, and a rear slope 594. The flat summit 590 extends a maximum radial distance or a deflection dimension from the tube exterior. The front slope 592 and the rear slope 594 extend downward from the flat summit 590 toward the tube exterior 113. The tapered edge 560 is located at the intersection of the front slope 592 and the flat summit 590.

Figure 6:
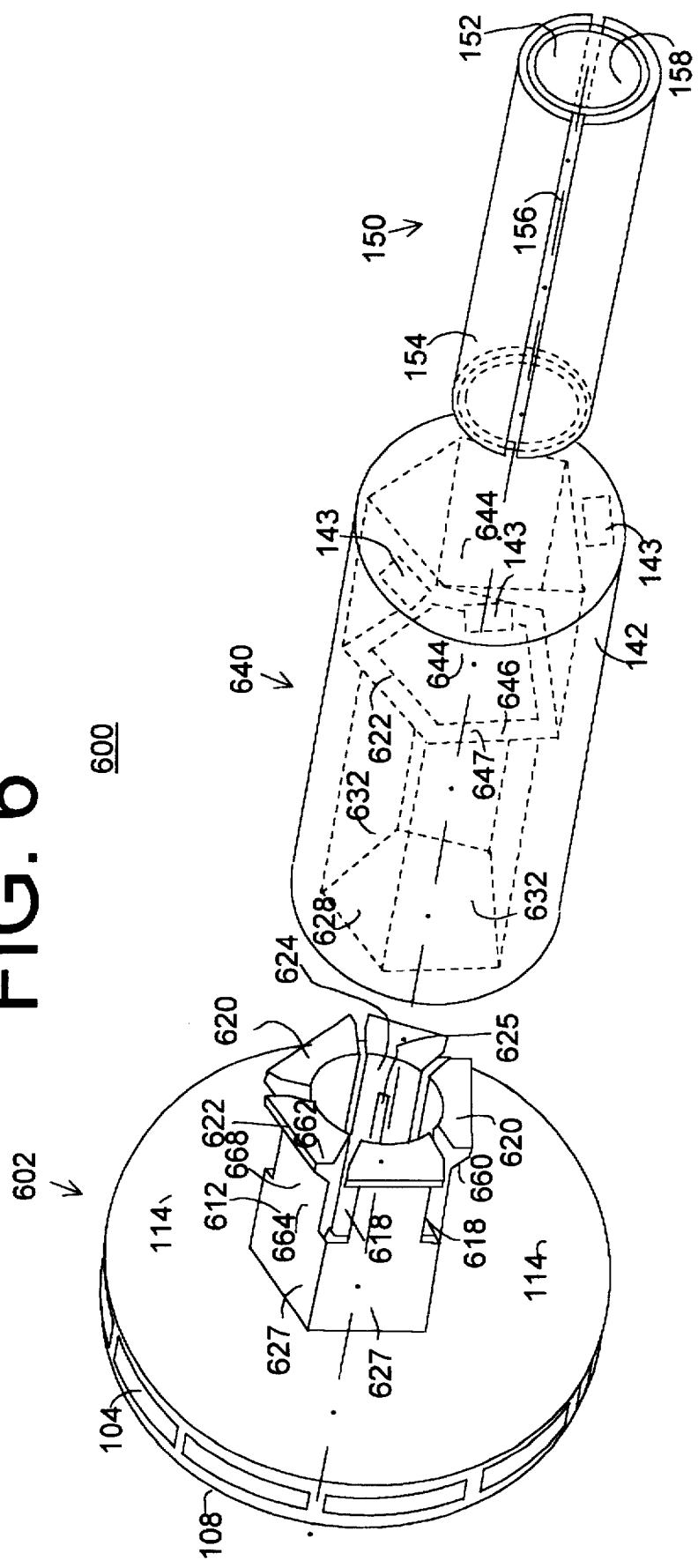
FIG. 6 is an exploded, perspective view of a fourth embodiment of the multipartite impeller assembly featuring a polygonal projection extending from the rear shroud, wherein the polygonal projection has cantilever arms terminating in snap-fit protrusions.

FIG. 6 shows a third embodiment of the impeller assembly 600. The impeller portion 602 preferably has a closed-impeller configuration with a front shroud 108 and a rear shroud 114. The front shroud 108 is adjacent to the intake for the blades or vanes. The outlets 104 of the impeller portion 602 are located about the radial periphery of the impeller portion 602.

The impeller portion 602 has a polygonal projection 612 extending axially from the center of the rear shroud 114. The polygonal projection 612 has a projection interior 624. The projection interior 624 has a substantially cylindrical shape that is oriented coaxially with respect to the radial bearing 150 or another cylindrical member. The projection interior 624 optimally has ridges 625 for interfacing with the radial bearing 150. The polygonal projection 612 has projection sides 627. The projection sides 627 terminate in snap-fit protrusions 620.

The polygonal projection 612 interlocks with and engages its corresponding polygonal recess 628. Rotation of the polygonal recess 628 imparts rotation in the polygonal projection 612 and to the rest of the impeller portion 602. The polygonal projection 612 preferably has a number of projection sides 627 which corresponds to the number of impeller blades such that internal forces in the impeller portion 602 are evenly distributed. For example, if the impeller portion 602 has five blades then the polygonal projection 612 is optimally pentagonal. Likewise, if the impeller has six blades, then the polygonal projection should have six projection sides.

Proportional correspondence between the number of sides of the polygonal projection 612 and the number of blades produces cyclo-symmetric forces within the rear impeller shroud 114 and through the polygonal projection 612. Cyclo-symmetric forces means, for example, that the stress at each corner of the polygonal projection 612 is approximately the same. The rear shroud 114 tends to warp less from applied stresses when forces are evenly distributed throughout the rear shroud 114. Moreover, correspondence between the number of sides of polygonal projection 612 and the number of blades permits the polygonal projection 612 to have a uniform cross-sectional thickness and construction.

The impeller portion 602 is made from a corrosion-resistant plastic, a fluoroplastic, a polymer, a fiber-reinforced plastic, a plastic composite, a polymer composite, a fiber-reinforced polymer, or the like.

The magnetic coupler 640 is generally cylindrical except for a polygonal recess 628 and snap-fit cavity 644 located along the magnetic coupler's axis. One end of the magnetic coupler 640 contains the polygonal recess 628 that has a size and shape corresponding to the polygonal projection 612. The opposite end of the magnetic coupler 640 has a snap-fit cavity 644. The snap-fit cavity 644 is a substantially polygonal channel or a polyhedral chamber.

A snap-fit ledge 646 forms a boundary between the polygonal recess 628 and the snap-fit cavity 644. The snap-fit cavity 644 preferably extends to one end of the magnetic coupler 640 to simplify manufacturing. The snap-fit ledge 646 has a snap-fit ledge dimension 647 or shoulder that exceeds a corresponding radial dimension of the polygonal recess 628. In other words, the snap-fit cavity 644 has a cavity size which exceeds the recess size of the polygonal recess 628. The polygonal recess 628 has recess sides 632.

The snap-fit connector 622 includes cantilever, semi-annular arms 668 and a snap-fit cavity 644. Each semi-annular arm 668 preferably terminates in a snap-fit protrusion 620. An axial depth of the axial slot 618 demarcates an end 664 of the cantilever arm 668. The snap-fit protrusion 620, the polygonal recess 628, or both the snap-fit protrusion 620 and the polygonal recess 628 temporarily deform during the assembly process. The dimensions, geometry, and material of the snap-fit protrusion 620 are selected to deform without significant strain damage during the assembly process. Once assembled, the snap-fit protrusion 620 engages the snap-fit cavity 644 in a stress-free manner when external forces are ignored.

The snap-fit protrusion 620 is a substantially rectangular projection which is oriented perpendicularly with respect to its corresponding projection side 627. The snap-fit protrusion 620 preferably has a tapered edge 660 facing the rear shroud 114. The tapered edge 660 is nearest to the rear shroud 114 at the junction of the projection sides 627 and the snap-fit protrusion 620. The tapered edge 660 is angled with respect to the rear shroud 114. The tapered edge 660 rests against or near a snap-fit ledge 646 when assembled. The tapered edge 660 permits the snap-fit protrusion 620 to be disengaged and removed from the snap-fit cavity 644 when desired. The snap-fit ledge 646 has a snap-fit dimension 647 that is equal to or greater than the radial protrusion dimension 662 that the snap-fit protrusion 620 radially extends outward from the polygonal projection 612.

The snap-fit connector 622 has a series of semi-annular arms bounded by axial slots 618. The semi-annular arms 668 are treated like cantilever arms for dimensioning of the snap-fit connector 622 and selecting material for manufacturing the snap-fit connector 622.

The radial bearing 150 has an inner surface 152 and an outer surface 154. The inner surface 152 may be a ceramic material, while the outer surface 154 may be made from a plastic, a plastic composite, a polymer, a polymer composite, or a fiber-reinforced plastic. The inner surface 152 cooperates with a shaft that is coaxially surrounded by the inner surface 152. The outer surface 154 has a retaining channel 156 which corresponds to a ridge 625 in the projection interior 624. The ridge 625 and the retaining channel 156 are engaged so that the radial bearing 150 rotates with the impeller portion 602.

Figure 7:
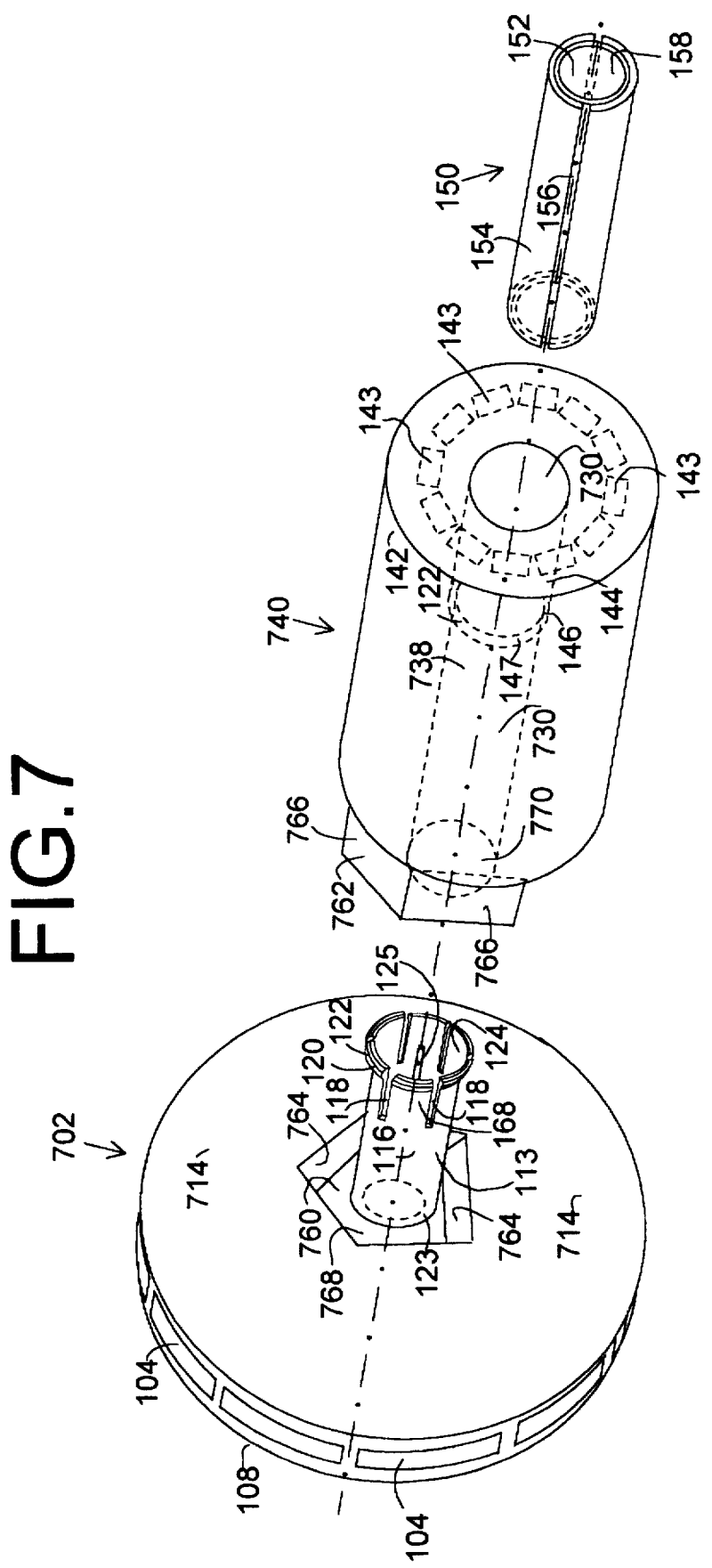
FIG. 7 is an exploded, perspective view of a fifth embodiment of the multipartite impeller assembly featuring a polygonal recess in the rear shroud and a polygonal extension extending from one end of the magnetic coupler.

FIG. 7 illustrates a fourth embodiment of the impeller assembly in which a pentagonal recess 760 is located in the rear shroud 714 of the impeller 702 and a polygonal extension 762 extends from an end of the magnetic coupler 740. In other words, the torque transmitting means comprises a polygonal extension 762, while the torque receiving means comprises a polygonal recess 760 that corresponds in size and shape to the polygonal extension 762. The polygonal extension 762 has extension walls 766. The polygonal recess 760 has recess walls 764 and a recess bottom 768. The polygonal extension 762 has a centrally located hole 770 that adjoins the hollow core 730 of the magnetic coupler 740. A radius of a cylindrical hollow region 738 is preferably smaller than a radius of the snap-fit cavity 144.

Figure 8:
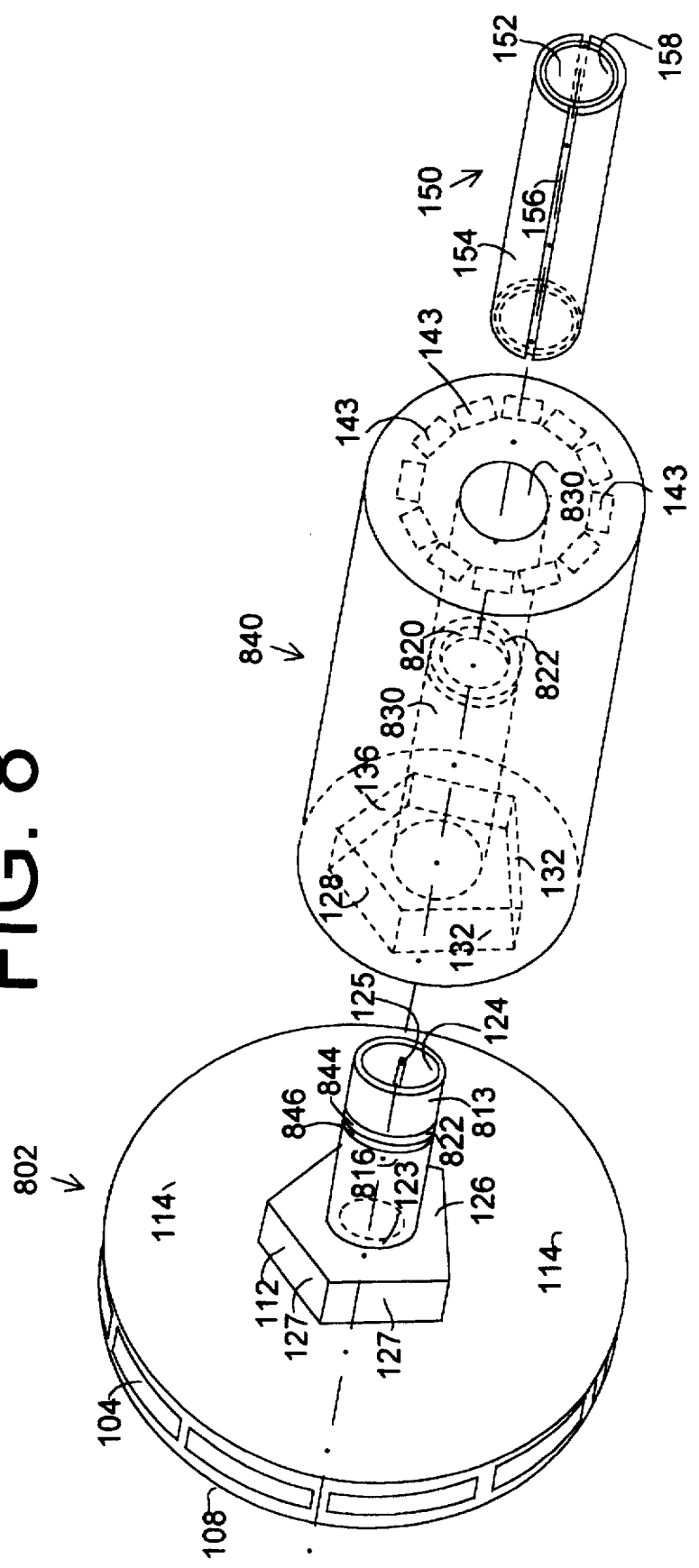
FIG. 8 is an exploded, perspective view of a sixth embodiment of the impeller assembly which features a snap-fit protrusion in the hollow core and a snap-fit cavity in the tube exterior.

FIG. 8 illustrates a fifth embodiment of the impeller assembly in which a snap-fit cavity 844 is located in a tube exterior 813 of a tube 816. The snap-fit cavity 844 optimally comprises an annular channel that mates with a snap-fit protrusion 820 extending from within the hollow core 830 of the magnetic coupler 840. Together the snap-fit cavity 844 and the snap-fit protrusion 820 form a snap-fit connector 822. The snap-fit cavity 844 has an annular wall 846. The snap-fit protrusion 820 is optimally a substantially annular snap-fit protrusion that extends radially inward into the hollow core 830.

The foregoing detailed description is provided in sufficient detail to enable one of ordinary skill in the art to make and use the multipartite impeller assembly for a centrifugal pump. The foregoing detailed description is merely illustrative of several physical embodiments of the impeller assembly. Physical variations of the impeller assembly not fully described in the specification, are encompassed within the purview of the claims. Accordingly, the narrow description of the elements in the specification should be used for general guidance rather than to unduly restrict the broader descriptions of the elements in the following claims.

I claim:

1. An impeller assembly for a centrifugal pump, the impeller assembly comprising:
   an impeller portion having a rear shroud, impeller blades, a tube, and torque receiving means for receiving and transferring torque to the impeller portion; said torque receiving means being associated with the rear shroud, the tube extending axially from the rear shroud, the tube having a tube exterior, said torque receiving means located radially outward from the tube exterior;
   a magnetic coupler having a substantially hollow core, a magnetic coupling region, and torque transmitting means for transmitting torque from the magnetic coupler to the impeller portion; said torque receiving means interlocking with and engaging said torque transmitting means;
   a snap-fit connector for connecting the impeller portion to the magnetic coupler, the snap-fit connector being associated with the tube and the hollow core;
   locking means for locking the snap-fit connector in a connected state, the locking means located within a tube interior of the tube, said locking means being distinct from the tube, said locking means oriented adjacent to the snap-fit connector, said locking means opposing possible radial movement associated with the snap-fit connector, the possible radial movement tending to disengage the snap-fit connector from the connected state.

2. The impeller assembly of claim 1 wherein said locking means comprises a substantially cylindrical member located coaxially within the tube interior, said locking means located radially inward with respect to the snap-fit connector.

3. The impeller assembly of claim 1 wherein said locking means comprises a substantially cylindrical sleeve, the substantially cylindrical sleeve located coaxially within the tube interior.

4. The impeller assembly of claim 1 wherein the locking means comprises a radial bearing, the radial bearing coaxially located within the tube interior.

5. The impeller assembly of claim 1 wherein the snap-fit connector comprises a combination of a snap-fit protrusion and a snap-fit cavity, the snap-fit connector being in said connected state in which the snap-fit protrusion engages and interlocks with the snap-fit cavity, said locking means substantially restricting the radial movement of the snap-fit protrusion located within the snap-fit cavity.

6. The impeller assembly of claim 1 wherein the snap-fit connector comprises a combination of a snap-fit protrusion and a snap-fit cavity, the snap-fit protrusion having a tapered edge.

7. The impeller assembly of claim 1 wherein the snap-fit connector comprises a combination of a snap-fit protrusion and a snap-fit cavity; the snap-fit protrusion extending a maximum radial distance or deflection dimension from a tube exterior of the tube, the deflection dimension being approximately equal to, or less than a radial ledge dimension of the snap-fit cavity.

8. The impeller assembly of claim 1 wherein said torque transmitting means comprises a polygonal recess in the magnetic coupler, said torque transmitting means located near or associated with the hollow core of the magnetic coupler in an end of the magnetic coupler; and wherein the torque receiving means comprises a polygonal extension protruding axially from the rear shroud, said torque receiving means corresponding in size and shape to said torque transmitting means.

9. The impeller assembly of claim 1 wherein said torque transmitting means comprises a polygonal extension extending axially from the magnetic coupler, the polygonal extension coaxially containing a portion of the hollow core of the magnetic coupler; and wherein said torque receiving means comprises a polygonal recess located in the rear shroud, the polygonal extension corresponding in size and shape to the polygonal recess.

10. An impeller assembly for a centrifugal pump, the impeller assembly comprising:

an impeller portion having a rear shroud, impeller blades, a tube, and torque receiving means for receiving and transferring torque to the impeller portion; said torque receiving means being coextensive with or associated with the rear shroud, the tube extending axially from the rear shroud;

a magnetic coupler having a substantially hollow core, a magnetic coupling region, and torque transmitting means for transmitting torque from the magnetic coupler to the impeller portion; said torque receiving means interlocking with and engaging said torque transmitting means;

a radial bearing located within the hollow core of the magnetic coupler and coaxially positioned within a tube interior of the tube; and a snap-fit connector for connecting the impeller portion to the magnetic coupler, said snap-fit connector located around an outer surface of the radial bearing.

11. The impeller assembly of claim 10 wherein the snap-fit connector comprises a snap-fit joint selected from the group consisting of a discontinuous annular snap-fit joint, a substantially annular snap-fit joint, a discontinuous polygonal snap-fit joint, a substantially rectangular snap-fit joint, a cantilever arm snap-fit joint, and a continuous polygonal snap-fit joint.

12. The impeller assembly of claim 10 wherein said torque transmitting means comprises a polygonal recess in the magnetic coupler, said torque transmitting means located near or associated with the hollow core of the magnetic coupler in an end of the magnetic coupler; and wherein the torque receiving means comprises a polygonal extension protruding axially from the rear shroud, said torque receiving means corresponding in size and shape to said torque transmitting means.

13. The impeller assembly of claim 12 wherein said polygonal recess and said polygonal extension have a number of sides corresponding to a quantity of the impeller blades.

14. The impeller assembly of claim 13 wherein the impeller portion has five impeller blades and the polygonal extension and polygonal recess are pentagonal.

15. The impeller assembly of claim 10 wherein said torque transmitting means comprises a polygonal extension extending axially from the magnetic coupler, the polygonal extension containing a portion of the hollow core of the magnetic coupler; and wherein said torque receiving means comprises a polygonal recess located in the rear shroud, the polygonal extension corresponding in size and peripheral shape to the polygonal recess.

16. The impeller assembly of claim 15 wherein said polygonal recess and said polygonal protrusion have a number of sides corresponding to a quantity of the blades.

17. The impeller assembly of claim 10 wherein the snap-fit connector comprises a combination of a substantially annular snap-fit protrusion and a snap-fit cavity; the tube terminating in the annular snap-fit protrusion, the snap-fit cavity being located in the hollow core of the magnetic coupler; the tube being placed into a hollow region of the hollow core, the hollow region being a substantially cylindrical volume of the hollow core, and an outer surface of the radial bearing being placed adjacent to the tube interior.

18. The impeller assembly of claim 10 wherein the snap-fit connector comprises a combination of a discontinuous annular snap-fit protrusion and a corresponding snap fit cavity; the tube terminating in the discontinuous annular snap-fit protrusion, the snap-fit cavity being located in a hollow core of the magnetic coupler, the tube having axial slots diving the tube into a group of semi-annular snap-fit arms, the tube being placed into a hollow region of the hollow core, the hollow region being substantially cylindrical, and an outer surface of the radial bearing being adjacent to the tube interior.

19. The impeller assembly of claim 10 wherein the snap-fit connector comprises a combination of a snap-fit protrusion and corresponding snap-fit cavity, the corresponding snap-fit cavity being located in the hollow core of the magnetic coupler, the snap-fit protrusion extending from the tube and engaging the snap-fit cavity, a snap-fit ledge defining a boundary of the snap-fit cavity near a hollow region of the magnetic coupler, and the snap-fit ledge preventing axial movement of the impeller portion with respect to the magnetic coupler.

20. The impeller assembly of claim 19 wherein the snap-fit ledge has a radial ledge dimension selected to be equal to or greater than a permissible radial deflection of the snap-fit protrusion.

21. The impeller assembly of claim 19 wherein the snap-fit cavity is substantially annular and wherein the snap-fit cavity is located within the hollow core of the magnetic coupler.

22. The impeller assembly of claim 19 wherein the snap-fit cavity is substantially cylindrical and wherein the snap-fit cavity is located within the hollow core of the magnetic coupler, the snap-fit cavity extending to one end of the magnetic coupler.

23. The impeller assembly of claim 10 wherein the snap-fit connector includes a snap-fit protrusion and a snap-fit cavity; the snap-fit protrusion extending radially outward from the tube, the snap-fit protrusion having a snap-fit protrusion cross section with a tapered edge, the tapered edge being adjacent to a snap-fit ledge when the snap-fit protrusion engages its corresponding snap-fit cavity, the snap-fit ledge defining a portion of the snap-fit cavity.

24. The impeller assembly of claim 10 wherein the snap-fit connector includes a snap-fit protrusion having a snap-fit cross section consisting of a substantially flat summit, a front slope, and a rear slope; the flat summit extending a maximum radial distance or deflection dimension from a tube exterior of the tube, the front slope and rear slope extending radially downward from the flat summit toward the tube exterior.

25. The impeller assembly of claim 10 wherein the snap-fit connector includes a snap-fit protrusion extending radially inward from a hollow region within the hollow core of the magnetic coupler, and wherein a corresponding snap-fit recess is located within a tube exterior of the tube, the snap-fit protrusion engaging the snap-fit recess.

26. The impeller assembly of claim 10 wherein the magnetic coupler further comprises a reinforcement sleeve and magnets, the reinforcement sleeve constructed from a metal, the reinforcement sleeve and the magnets being encapsulated within a corrosion-resistant layer.

27. An impeller assembly for a centrifugal pump, the impeller assembly comprising:

an impeller portion having a rear shroud, impeller blades, a polygonal projection, said polygonal projection extending axially from the rear shroud;

a magnetic coupler having a substantially hollow core, a magnetic coupling region, and a polygonal recess located in one end of the magnetic coupler, said polygonal recess interlocking with and engaging said polygonal projection;

a radial bearing located substantially within the hollow core of the magnetic coupler and coaxially positioned within a projection interior of the polygonal projection; and a snap-fit connector for connecting the impeller portion to the magnetic coupler, said snap-fit connector located around an outer surface of the radial bearing.

28. The impeller assembly of claim 27 wherein the snap-fit connector comprises a combination of substantially rectangular snap-fit protrusions and a polygonal snap-fit cavity, the polygonal snap-fit cavity located in the hollow core of the magnetic coupler, the rectangular snap-fit protrusions extending partially or completely radially from the polygonal projection, and a snap-fit step defining a portion of the snap-fit cavity.

29. The impeller assembly of claim 27 wherein the polygonal projection has a substantially cylindrical projection interior, the outer portion of the radial bearing engaging the substantially cylindrical projection interior.

30. The impeller assembly of claim 27 wherein the snap-fit connector includes respective snap-fit protrusions extending primarily radially outward from corresponding sides of the polygonal projection, and wherein the sides of the polygonal projection are divided by axial slots to form cantilever arms.

31. The impeller assembly of claim 30 wherein each snap-fit protrusion has a tapered edge facing the rear shroud of the impeller portion.

32. The impeller assembly of claim 27 wherein a number of the impeller blades is approximately equal to a quantity of projection sides of the polygonal projection.

33. A method of assembling impeller subassemblies, the method comprising the steps of:

a) providing an impeller portion with an axially extending tube, a magnetic coupler with a hollow core, and a snap-fit connector associated with the tube and the hollow core;

b) inserting the tube into the hollow core provided;

c) aligning the impeller portion with the magnetic coupler provided so that a torque receiving means of the impeller portion engages a torque transmitting means of the magnetic coupler;

d) joining the snap-fit connector to secure the impeller portion to the magnetic coupler after aligning the impeller portion with the magnetic coupler; and e) placing a radial bearing in the tube adjacent to the snap-fit connector previously joined.

34. The method of claim 33 further comprising the step f) of selecting the impeller portion from a variety of impeller portions having distinct hydraulic characteristics, and any one of the variety of impeller portions being capable of combining with the magnetic coupler.

35. The method of claim 33 further comprising the step of f) selecting the impeller portion from a variety of impeller portions having distinct design flow rates and distinct design pressure outputs, any one of the variety of the impeller portions being capable of combining with the magnetic coupler.

36. The method of claim 33 further comprising step f) of selecting the magnetic coupler from a variety of magnetic couplers having distinct magnetic characteristics, any one of the magnetic couplers being capable of combining with the impeller portion.

37. The impeller assembly according to claim 1 wherein the snap-fit connector includes a snap-fit protrusion radially extending outward from the tube exterior.

38. The impeller assembly according to claim 37 wherein the snap-fit protrusion is associated with a terminating end of the tube.

39. The impeller assembly of claim 1 wherein the magnetic coupler and the impeller portion are connected in a threadless manner to each other.

40. The impeller assembly of claim 1 wherein the magnetic coupling region forms a band about a periphery of the magnetic coupler.

41. The impeller assembly of claim 1 wherein said locking means comprises a removable reinforcement oriented radially adjacent to the snap-fit connector, said locking means being removable from the impeller assembly regardless of whether the snap-fit connector is in the connected state.

42. The impeller assembly of claim 1 wherein the snap-fit connector includes a snap-fit cavity located in the hollow core.

43. The impeller assembly of claim 10 wherein the snap-fit connector includes a snap-fit protrusion and a snap-fit cavity; the snap-fit protrusion extending partially radially outward from the tube, the snap-fit protrusion having a tapered surface, the tapered surface being adjacent to a snap-fit ledge when the snap-fit protrusion engages the snap-fit cavity.

* * * * *